US008768355B2

(12) United States Patent
Garcia Martin et al.

(10) Patent No.: US 8,768,355 B2
(45) Date of Patent: Jul. 1, 2014

(54) ANDSF PROVISIONING

(75) Inventors: Miguel Angel Garcia Martin, Pozuelo de Alarcon (ES); Pablo Martinez De La Cruz, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 99 days.

(21) Appl. No.: 13/337,791

(22) Filed: Dec. 27, 2011

(65) Prior Publication Data

US 2013/0165131 A1    Jun. 27, 2013

(51) Int. Cl.
*H04W 4/00* (2009.01)

(52) U.S. Cl.
USPC ............ 455/435.1; 455/456.1; 455/456.6; 455/456.5; 455/404.2; 455/456.3; 455/411; 455/410

(58) Field of Classification Search
USPC ................. 455/456.6, 456.1, 404.2
See application file for complete search history.

(56) References Cited

U.S. PATENT DOCUMENTS

| | | | | |
|---|---|---|---|---|
| 2002/0072369 A1* | 6/2002 | Sasada et al. | ............. | 455/435 |
| 2007/0129084 A1* | 6/2007 | Sylvain | ............. | 455/456.1 |
| 2010/0048176 A1* | 2/2010 | Osborn | ............. | 455/411 |
| 2012/0140743 A1* | 6/2012 | Pelletier et al. | ............. | 370/335 |
| 2013/0040692 A1* | 2/2013 | Chen et al. | ............. | 455/525 |

FOREIGN PATENT DOCUMENTS

| | | |
|---|---|---|
| EP | 2 393 326 A1 | 12/2011 |
| EP | 2 437 558 A1 | 4/2012 |
| WO | WO 2009/146741 A1 | 12/2009 |
| WO | WO 2010/002317 A1 | 1/2010 |
| WO | WO 2010/148551 A1 | 12/2010 |

OTHER PUBLICATIONS

Telecom Italia. Solutions to Simplify the Configuration and Maintenance of the ANDSF. 3GPP Draft; S2-092080. Mar. 24, 2009.
Doppler, et al. On Efficient Discovery of Next Generation Local Area Networks. 2011 IEEE Wireless Communications and Networking Conference (WCNC). Mar. 28, 2011.

* cited by examiner

*Primary Examiner* — Khalid W Shaheed

(57) ABSTRACT

A PUE in communication with an ANDSF server through an access network includes a network interface unit of the PUE from which a registration request is sent to the ANDSF server through the access network and which receives a successful authentication result and a set of configuration instructions from the ANDSF server. The PUE includes a processing unit of the PUE which determines one or more observation triggers from the set of configuration instructions. Upon fulfillment of the observation trigger, the processing unit activates one or more interfaces supported by the PUE, which the set of configuration instructions requires to be monitored. The processing unit determines consolidated areas, wherein each consolidated area includes those geographical points with given network characteristics for one or more accessible networks. The consolidated areas data are stored in the memory and submitted by the network interface unit to the ANDSF server through the access network.

16 Claims, 4 Drawing Sheets

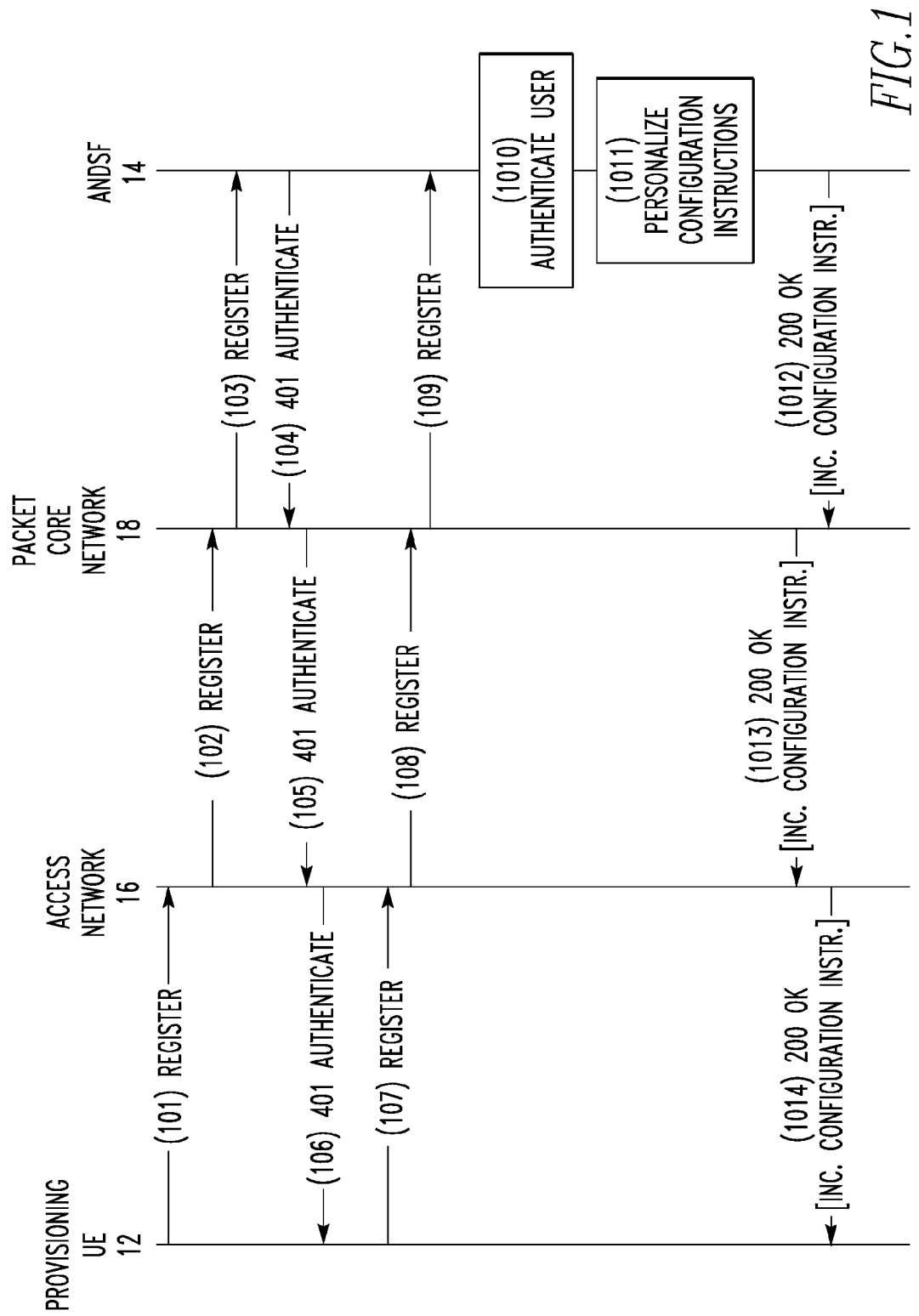

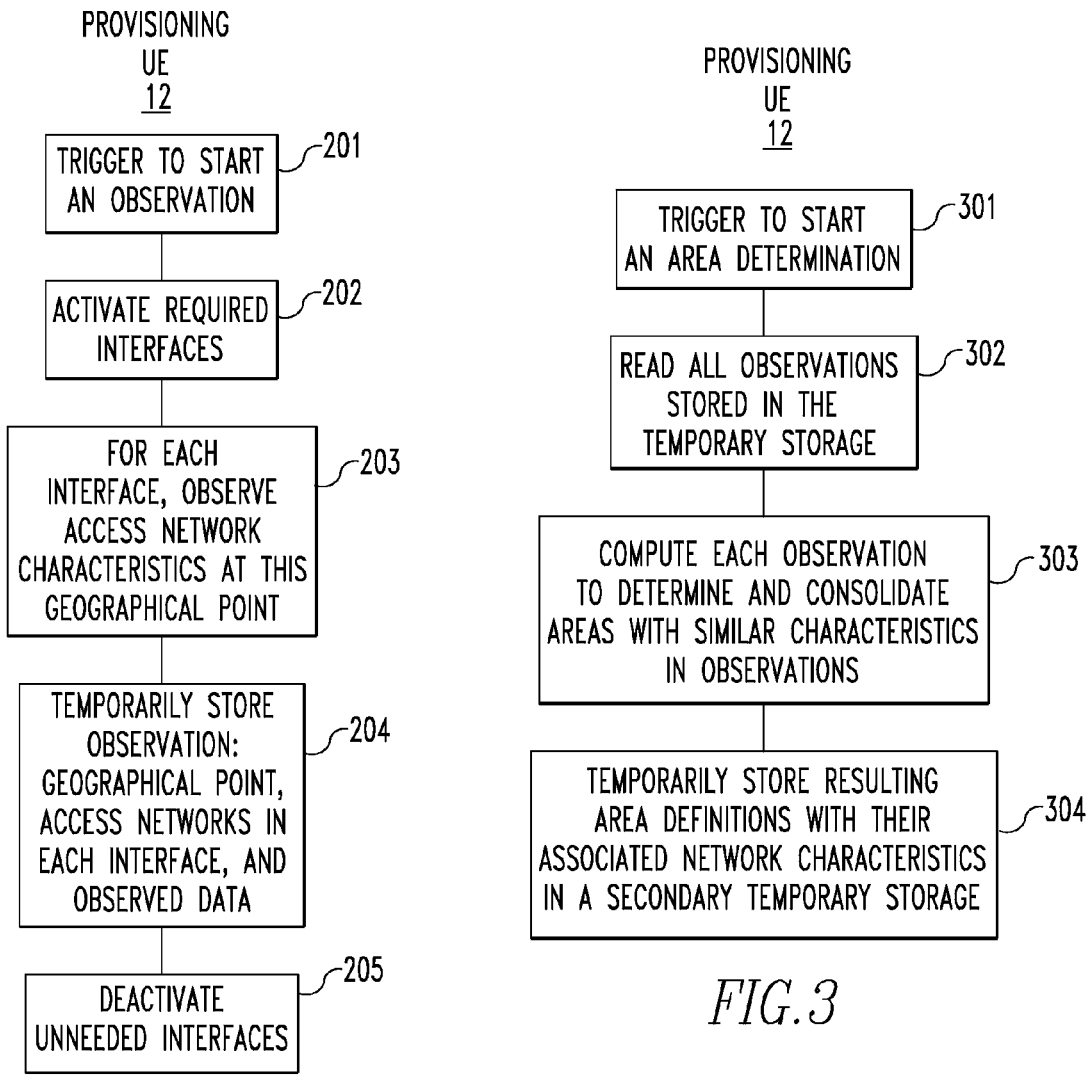

ANDSF PROVISIONING

TECHNICAL FIELD

The present invention generally relates to provisioning of Access Network Discovery and Selection Function of PCC architecture. (As used herein, references to the "present invention" or "invention" relate to exemplary embodiments and not necessarily to every embodiment encompassed by the appended claims.) More specifically, the present invention relates to provisioning of Access Network Discovery and Selection Function of PCC architecture, particularly to said provisioning performed from wireless terminals.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The Access Network Discovery and Selection Function (ANDSF) is an entity introduced by 3GPP as part of their Release 8 set of specifications, within an Evolved Packet Core (EPC) of the System Architecture Evolution (SAE) for 3GPP compliant mobile networks. The purpose of the ANDSF is to assist User equipment (UE) to discover non-3GPP access networks—such as Wi-Fi or WIMAX—that can be used for data communications in addition to 3GPP access networks (such as HSPA or LTE) and to provide the UE with rules policing the connection to these networks.

An ANDSF can provide the following information to a UE, based on operator configuration:

Inter-System Mobility Policy (ISMP)—network selections rules for a UE with no more than one active access network connection (e.g., either LTE or Wi-Fi).

Inter-System Routing Policy (ISRP)—network selection rules for a UE with potentially more than one active access network connection (e.g., both LTE and Wi-Fi). Such UE may employ IP Flow Mobility (IFOM), Multiple Access PDN Connectivity (MAPCON) or non-seamless Wi-Fi offload according to operator policy and user preferences.

Discovery Information—a list of networks that may be available in the vicinity of the UE and information assisting the UE to expedite the connection to these networks.

The ANDSF communicates with the UE over the S14 reference point, which is essentially a synchronization of an OMA-DM Management Object (MO) specific to ANDSF.

Standardization has been focusing on the definition of the S14 interface to cover requirements for the transmission of information between an ANDSF and a UE, understanding the UE as a consumer of Access Network Discovery Information. The standard assumes that the ANDSF is able to return a list of networks (sorted by priority order) that provide services in the geographical area where the UE is currently located, as well as information that allows their discovery.

According to the current art, the operator should provision an ANDSF database. This database should contain enough accurate up-to-date information that lists geographical points and the networks that provide coverage in the surrounding area of that point.

Previous art (see WO 2010/002317) focuses on provisioning a map of inter-access technology neighbor relations. Relationship between neighboring cells of different access networks of the same for different access technologies are maintained including non-3GPP domain neighbor relationships. Focus on the described art is put on configuring a neighbor relations map, as well as sending steering instructions from the network to the reporting terminals.

WO 2010/002317 focuses on reporting network relations. It also describes the detailed information that is transmitted from the wireless terminals to the ANDSF server. This set of information includes at least an access technology and a global cell identity, and may also include a physical cell identity, carrier frequency, carrier bandwidth, registration area identity, network identity, operator identity, cell specific configuration usefulness indicator, success/failure probability of handover or movement in idle mode, and location.

Typically bandwidth in wireless networks is a scarce resource. While it is desired to have a high detailed information of the coverage of wireless networks, it is also true that the number and size of payload of the transmissions between these wireless terminals and the ANDSF server should be kept to a minimum. Additionally, wireless terminals do not have infinite storage and infinite computing power, so care must be taken to minimize the footprint of the monitoring means as for to not consume excessive resources in the terminal. Additionally, the actual contents of payload messages are not specified in detail. It is the goal of the present invention to mitigate these problems in wireless devices used to provisioning ANDSF servers.

To overcome these problems, or at least to mitigate them, the present invention provides for new provisioning wireless devices and method of provisioning ANDSF servers by said provisioning wireless devices.

BRIEF SUMMARY OF THE INVENTION

The present invention pertains to a Provisioning User Equipment (PUE) in communication with an Access Network Discovery and Selection Function (ANDSF) server through an access network. The PUE comprises a network interface unit of the PUE from which a registration request is sent to the ANDSF server through the access network and which receives a successful authentication result and a set of configuration instructions from the ANDSF server. The PUE comprises a processing unit of the PUE which determines one or more observation triggers from the set of configuration instructions. Upon fulfillment of the observation trigger, the processing unit activates one or more interfaces supported by the PUE, which the set of configuration instructions requires to be monitored. The PUE comprises a memory of the PUE which stores observation data and geographical points where an observation takes place. The processing unit determines consolidated areas, wherein each consolidated area includes those geographical points with given network characteristics for one or more accessible networks. The consolidated areas data are stored in the memory and submitted by the network interface unit to the ANDSF server through the access network.

The present invention pertains to an ANDSF server in communication with a PUE through an access network. The ANDSF comprises a network interface unit of the ANDSF server which receives a registration message from the PUE through the access network. The ANDSF comprises a processing unit of the ANDSF server which authenticates the PUE, and generates a set of configuration instructions for the PUE by taking into account subscription data and PUE characteristics. The processing unit sending from the network interface unit through the access network to the PUE a successful authentication result and the set of configuration instructions. The ANDSF comprises a memory of the ANDSF server in which consolidated areas data received by the network interface unit from the PUE through the access network are stored, wherein a number and size of payloads for transmission between the PUE and the ANDSF server are minimized.

The present invention pertains to a method of provisioning an ANDSF server from/by a PUE through an access network. The method comprises the steps of receiving a registration message by a network interface unit of the ANDSF server from the PUE through the access network. There is the step of authenticating the PUE by a processing unit of the ANDSF server. There is the step of generating by the processing unit of the ANDSF server a set of configuration instructions for the PUE by taking into account subscription data and PUE characteristics. There is the step of sending to the PUE by the processing unit, from the network interface unit, of the ANDSF server through the access network a successful authentication result and the set of configuration instructions. There is the step of storing in a memory of the ANDSF server consolidated areas data received by the network interface unit from the PUE through the access network, wherein a number and size of payloads for transmission between the PUE and the ANDSF server are minimized.

The present invention pertains to a method for a PUE provisioning an ANDSF server through an access network. The method comprises the steps of sending a registration request from a network interface unit of the PUE to the ANDSF server through the access network. There is the step of receiving by the network interface unit of the PUE a successful authentication result and a set of configuration instructions from the ANDSF server through the access network. There is the step of determining with a processing unit of the PUE one or more observation triggers from the set of configuration instructions, upon fulfillment of the observation trigger, the processing unit activating one or more interfaces supported by the PUE, which the set of configuration instructions requires to be monitored. There is the step of storing in a memory of the PUE observation data and geographical points where an observation takes place. There is the step of determining with the processing unit of the PUE consolidated areas, wherein each consolidated area includes those geographical points with given network characteristics for one or more accessible networks. There is the step of storing in the memory of the PUE the consolidated areas data. There is the step of submitting by the network interface unit of the PUE to the ANDSF server through the access network the consolidated areas data.

BRIEF DESCRIPTION OF THE DRAWINGS

In the accompanying drawings, the preferred embodiment of the invention and preferred methods of practicing the invention are illustrated in which:

FIG. 1 shows signalling regarding registration and configuration with respect to the present invention.

FIG. 2 shows observation flow chart of events.

FIG. 3 shows a flow chart of area determination.

DETAILED DESCRIPTION

Figure 6:
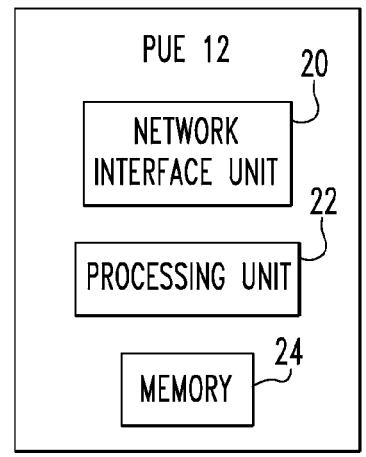
FIG. 6 is a block diagram of a PUE of the present invention.
Figure 7:
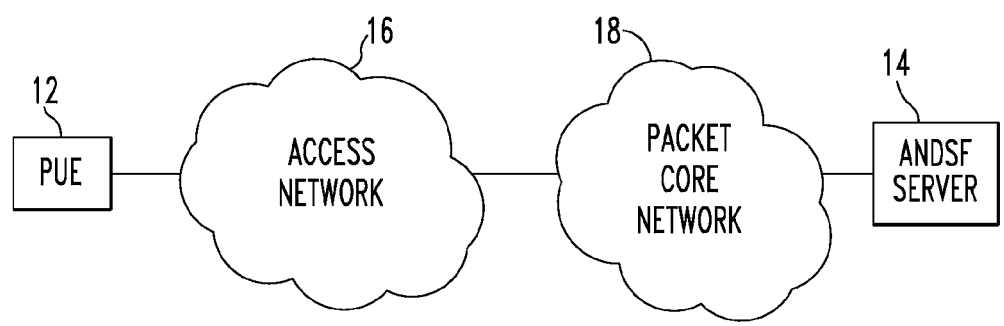
FIG. 7 is a schematic representation of the architecture of the present invention

Referring now to the drawings wherein like reference numerals refer to similar or identical parts throughout the several views, and more specifically to FIGS. 6 and 7 thereof, there is shown a PUE 12 in communication with an ANDSF server 14 through an access network 16. The PUE 12 comprises a network interface unit 20 of the PUE 12 from which a registration request is sent to the ANDSF server 14 through the access network 16 and which receives a successful authentication result and a set of configuration instructions from the ANDSF server 14. The PUE 12 comprises a processing unit 22 of the PUE 12 which determines one or more observation triggers from the set of configuration instructions. Upon fulfillment of the observation trigger, the processing unit 22 activates one or more interfaces supported by the PUE 12, which the set of configuration instructions requires to be monitored. The PUE 12 comprises a memory 24 of the PUE 12 which stores observation data and geographical points where an observation takes place. The processing unit 22 determines consolidated areas, wherein each consolidated area includes those geographical points with given network characteristics for one or more accessible networks. The consolidated areas data are stored in the memory 24 and submitted by the network interface unit 20 to the ANDSF server 14 through the access network 16.

The processing unit 22 may determine one or more process triggers and one or more transmission triggers from the set of configuration instructions. For each activated interface, the processing unit 22 may cause accessible networks and corresponding network characteristics to be observed. Upon fulfillment of the process trigger, the processing unit 22 may process the stored observations, identifying geographical points where the accessible network share one or more network characteristics. Upon fulfillment of the transmission trigger, the processing unit 22 may transmit through the network interface unit 20 the consolidated areas data through the access network 16 to the ANDSF server 14.

Figure 5:
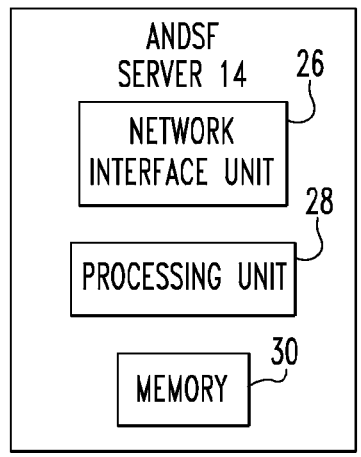
FIG. 5 is a block diagram of an ANDSF of the present invention.

The present invention pertains to an ANDSF server 14 in communication with a PUE 12 through an access network 16, as shown in FIG. 5. The ANDSF server 14 comprises a network interface unit 26 of the ANDSF server 14 which receives a registration message from the PUE 12 through the access network 16. The ANDSF server 14 comprises a processing unit 28 of the ANDSF server 14 which authenticates the PUE 12, and generates a set of configuration instructions for the PUE 12 by taking into account subscription data and PUE 12 characteristics. The processing unit 28 sends from the network interface unit 26 through the access network 16 to the PUE 12 a successful authentication result and the set of configuration instructions. The ANDSF server 14 comprises a memory 30 of the ANDSF server 14 in which consolidated areas data received by the network interface unit 26 from the PUE 12 through the access network 16 are stored, wherein a number and size of payloads for transmission between the PUE 12 and the ANDSF server 14 are minimized.

The network interface unit 26 may send a challenge to the PUE 12 through the access network 16 for the PUE 12 to be authenticated. The network interface unit 26 may receive a challenge response in a second registration message. The processing unit 28 may compare the challenge response received from the PUE 12 with a local result determined by the processing unit 28 for a match, and the processing unit 28 authenticates the PUE 12 if there is a match.

The present invention pertains to a method of provisioning an ANDSF server 14 from/by a PUE 12 through an access network 16. The method comprises the steps of receiving a registration message by a network interface unit 26 of the ANDSF server 14 from the PUE 12 through the access network 16. There is the step of authenticating the PUE 12 by a processing unit 28 of the ANDSF server 14. There is the step of generating by the processing unit 28 of the ANDSF server 14 a set of configuration instructions for the PUE 12 by taking into account subscription data and PUE 12 characteristics. There is the step of sending to the PUE 12 by the processing unit 28, from the network interface unit 26, of the ANDSF server 14 through the access network 16 a successful authentication result and the set of configuration instructions. There is the step of storing in a memory 30 of the ANDSF server 14 consolidated areas data received by the network interface unit 26 from the PUE 12 through the access network 16, wherein a number and size of payloads for transmission between the PUE 12 and the ANDSF server 14 are minimized.

There may be the step of the network interface unit 26 of the ANDSF server 14 sending a challenge to the PUE 12 through the access network 16 for the PUE 12 to be authenticated. There may be the step of the network interface unit 26 of the ANDSF server 14 receiving a challenge response in a second registration message. There may be the steps of the processing unit 28 comparing the challenge response received from the PUE 12 with a local result determined by the processing unit 28 for a match, and the processing unit 28 authenticating the PUE 12 if there is a match.

The present invention pertains to a method for a PUE 12 provisioning an ANDSF server 14 through an access network 16. The method comprises the steps of sending a registration request from a network interface unit 20 of the PUE 12 to the ANDSF server 14 through the access network 16. There is the step of receiving by the network interface unit 20 of the PUE 12 a successful authentication result and a set of configuration instructions from the ANDSF server 14 through the access network 16. There is the step of determining with a processing unit 22 of the PUE 12 one or more observation triggers from the set of configuration instructions, upon fulfillment of the observation trigger, the processing unit 22 activating one or more interfaces supported by the PUE 12, which the set of configuration instructions requires to be monitored. There is the step of storing in a memory 24 of the PUE 12 observation data and geographical points where an observation takes place. There is the step of determining with the processing unit 22 of the PUE 12 consolidated areas, wherein each consolidated area includes those geographical points with given network characteristics for one or more accessible networks. There is the step of storing in the memory 24 of the PUE 12 the consolidated areas data. There is the step of submitting by the network interface unit 20 of the PUE 12 to the ANDSF server 14 through the access network 16 the consolidated areas data.

There may be the step of the processing unit 22 determining one or more process triggers and one or more transmission triggers from the set of configuration instructions. For each activated interface, there may be the step of the processing unit 22 causing accessible networks and corresponding network characteristics to be observed. Upon fulfillment of the process trigger, there may be the step of the processing unit 22 processing the stored observations, identifying geographical points where the accessible network share one or more network characteristics. Upon fulfillment of the transmission trigger, there may be the step of the processing unit 22 transmitting through the network interface unit 20 the consolidated areas data through the access network 16 to the ANDSF server 14.

In the operation of the invention, the present invention is based on the notion of so-called provisioning UEs. These are specialized User Equipments which, additionally to consuming access network 16 discovery information, provide the following functionality:

Provisioning UEs 12 monitor the access network 16 conditions of their surrounding area, searching for the availability of existing access networks 16 of a variety of access technologies and frequencies in the spectrum.

For each observed access network 16 technology/frequency, the PUE 12 collects identification information (e.g., SSID in WLAN, MNC-MCC in 3GPP networks, global cell identity), accurate geographical information (e.g., supplied by a GPS receiver), observed quality of signal (e.g., signal strength, interference, signal bounces, etc.), observed geographical area with similar signal quality, physical cell identity, carrier frequency, carrier bandwidth, registration area identity, network identity, operator identity, cell specific configuration, usefulness indicator, success/failure probability of handover or movement in idle mode, location, etc. This can be done according to the existing prior art, e.g., WO 2010/002317.

Periodically, each Provisioning UE 12 samples at a number of geographical points the observed access networks 16 and their characteristics. Then the provisioning UE 12 locally stores in memory the observed data for future processing. The list of geographical points at which observations are collected is configured (sent from the network to the PUE 12 at the time of activation). This list may include, for example, take an observation periodically (every 30 seconds), or whenever the provisioning UE 12 moves a certain distance far from the point of the previous observation, or any combination of both.

Periodically, each PUE 12 correlates its stored data in memory. This correlation may comprise the PUE 12 determining a geographical area (defined as a polygon, circle, ellipse, or similar) which is characterized by the fact that any point within the perimeter of that area has similar access network 16 characteristics within a certain degree of confidence and uncertainty for at least one access network 16. For example, the PUE 12 may determine that any point in the area determined by a circle defined by a center point and its radius, there is a WLAN access network 16 with the SSID "WLAN-example", operating in a given frequency, received with a given signal strength, with a 90% degree of confidence and a +−10% of uncertainty (with respect to the location of the point in that area).

Uncertainty expresses the magnitude of the error, often a range.

Confidence expresses the probability that the target is actually in the specified uncertainty.

Periodically, according to configuration instructions, each PUE 12 sends to the. ANDSF server 14 data representing the set of determined geographical areas with common characteristics for one or more access network 16 technologies, together with the observed information that is common to that area. This is sent to the ANDSF server 14 via a well-defined provisioning interface.

Additionally, upon changes of a configured threshold, the provisioning UEs 12 can report existing data in real-time to the ANDSF 14 without waiting for correlating the stored data.

The invention is also based on the definition of a new provisioning interface defined between each provisioning UE 12 and an ANDSF 14. Such interface, denoted hereby as the provisioning interface, is based on the OMA Device Management interface, with a specialized Provisioning-ANDSF Management Object, that provides the following functionality:

Means for the provisioning UE 12 to retrieve configuration data from the ANDSF 14.

Means for the provisioning UE 12 to supply individual aggregated observations (e.g., determined by a geographical area) to the ANDSF 14.

Means for the provisioning UE 12 to supply aggregated observations to the ANDSF 14.

FIG. 1 shows an initialization phase, where a PUE 12 gets registered, authenticated, and it is supplied with configuration instructions. According to this, a provisioning UE 12 sends a first Register message (101) through an access network 16, packet core network 18 (102), and it is eventually received in an ANDSF 14 node (103). The ANDSF 14 node requires the PUE 12 to be authenticated. This can be done in several ways, for example, using the Generic Authentication Architecture (GAA) of 3GPP, however, FIG. 1 shows a more traditional challenge/response mechanism, such as the one traditionally used by HTTP Digest authentication. So, the ANDSF 14 sends a challenge in a 401 response (104), which is transmitted to the access network (105) and eventually to the PUE 12 (106).

The PUE 12 evaluates the challenge, and making usage of its provisioned credentials, creates the appropriate response to the received challenge and sends it in a new Register message (107), which is transmitted through the access network 16 (107), and Packet core network 18 (108), and eventually received by the ANDSF 14 node (109). The ANDSF 14 computes the received response and compares it with the locally computed result, and if both match, the user is authenticated (1010). The ANDSF 14 then, taking into account the user TD, the PUE 12 characteristics, and possible other factors, creates a set of personalized set of configuration instructions (1011). For example, if the hardware version of the PUE 12 is known to have limited battery lifetime, the configuration instructions may instruct the PUE 12 to take observations every hour, as opposed to every 5 minutes that other provisioning UE 12 with a good battery lifetime could take.

The ANDSF 14 sends these configuration instructions piggy-backed in a 200 OK message (1012), which acknowledges the authentication of the PUE 12. This message is transmitted through the Packet Core network (1012), the Access network (1013) and eventually received by the PUE 12 (1014).

FIG. 2 presents a sequence of events that describe a single observation taken by a PUE 12. The flow starts when a trigger to start an observation is fired (201). This trigger is determined by the received configuration instructions, and it could be, for example, due to a time expiration (if the configuration instructions indicate to take an observation periodically every x number of minutes), or it could be determined by the movement of the PUE 12 (if the configuration instructions indicate that an observation should be taken every time the PUE 12 moves farther than x number of meters from the place where the last observation was taken).

Then the PUE 12 will sequentially or in parallel activate, if they are not activated yet, one or more interfaces (202), out of those interfaces implemented in the PUE 12 and required by the configuration instructions to be monitored. Then, for each interface, the PUE 12 will observe the network characteristics, including frequencies, detected networks (e.g., SSIDs in WLAN, PLMN identities in cellular networks), cell ids, observed signal strength, and other characteristics.

The PUE 12 will then store (204) in memory the data of each observation, including the geographical point where the observation took place (for example, determined with the help of a GPS receiver), and the network characteristics of each observed network in each interface. After that, the PUE 12 deactivates those network interfaces that were explicitly activated for the purpose and are no longer required to be active (205).

According to FIG. 3, there is a first trigger that launches the process (301). This trigger may fire due to a timer which times out, due to number of collected observations, available capacity in memory, etc. In any case, the configuration instructions determine the trigger to start the process of area determination.

Then the process reads (302) all the observations already stored in memory, as well as each observation is marked as "processed" to allow a garbage collector process to delete already processed observations.

The PUE 12 then computes each observation to determine those geographical points where at least one of the access networks shares similar characteristics (303). This can be done, for example, by applying clustering techniques. The parameters for the clustering may indicate, for example, that an area is determined by the perimeter that comprise any geographical point where there is a WLAN access network 16 with the SSID "WLAN-example", operating in a given frequency, whose observation in that geographical point was received with a given signal strength, with a 90% degree of confidence and a +−10% of uncertainty (with respect to the location of the point in that area).

The result of step 303 is the definition of a consolidated area where with a given degree of confidence, any point within a given degree of uncertainty of being inside the said area will have a given network characteristics for at least one access network 16.

The results of the determined area, in particular the definition of the area (either by the polygon that determines the perimeter, or other parameter such as a geographical point that defines the center and the radius of a circumference), together with the associated network characteristics, and the degree of confidence and uncertainty, is all stored in a secondary memory for further processing.

Figure 4:
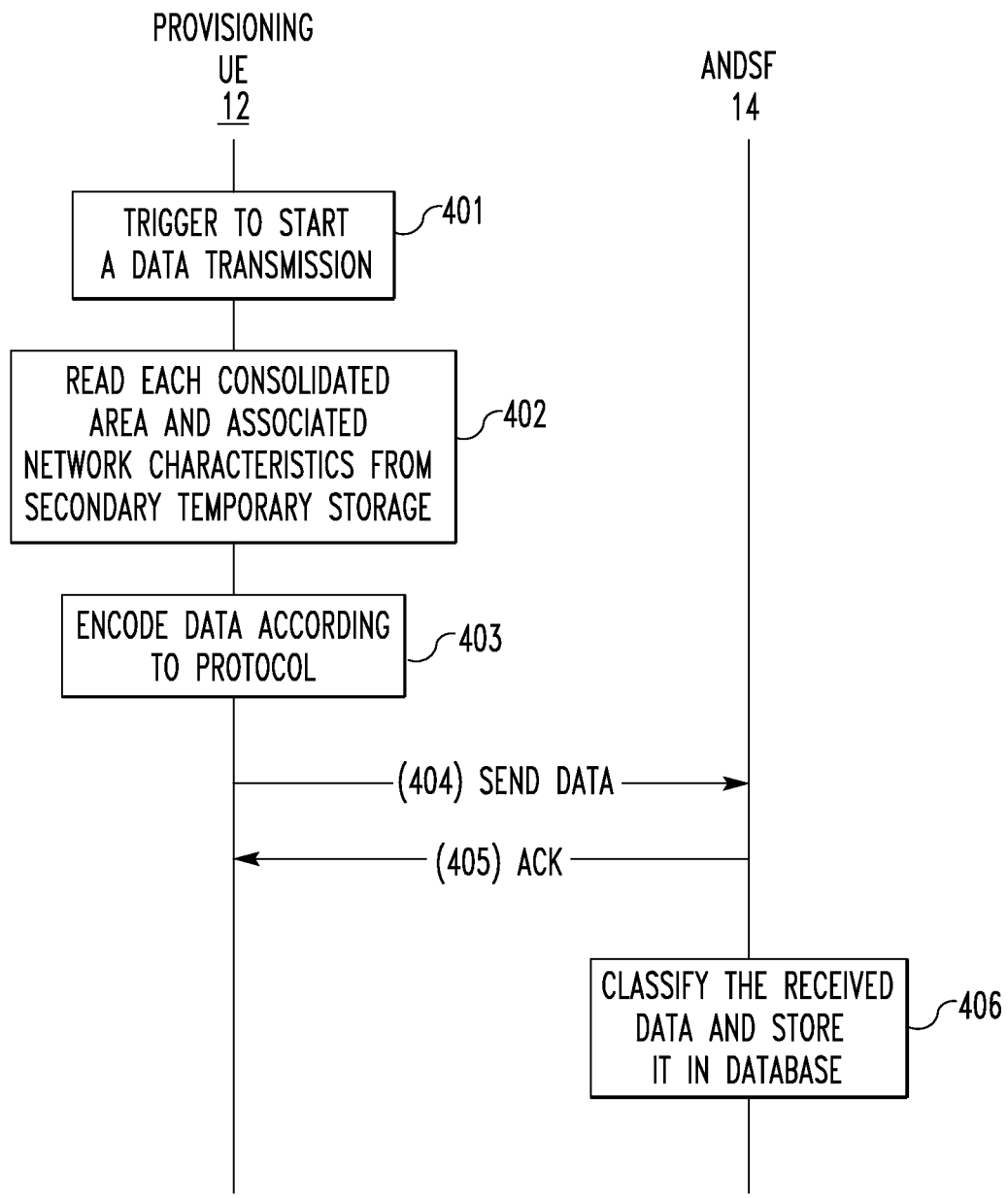
FIG. 4 shows a flow chart of data transmission.

FIG. 4 depicts the data transmission process, where a PUE 12 receives a trigger (401) to start a data transmission. This trigger (401) is configured in the received configuration instructions, and may indicate that the provisioning UE 12 starts the data transmission periodically, for example, every hour; or it may indicate that the provisioning UE 12 starts the data transmission whenever a new consolidated area has been determined and is available in the secondary memory.

The provisioning UE 12 then reads from the secondary memory each consolidated area definition and its associated network characteristics, which was previously stored in the secondary memory (402). Then the provisioning UE 12 marks each consolidated area as "processed", so that the garbage collector function can safely deleted processed consolidated areas.

The provisioning UE 12 then encodes the data (definition of the area, associated network characteristics, etc.) in a given format of the protocol (403). Then it sends those data (404) to the ANDSF 14, according to a transmission protocol. The ANDSF 14 acknowledges (405) the reception of the data and then it classifies and stores the received data in its database (406).

Format of the Description of the Consolidated Area

The problem to be solved is to create a format for describing an area as well as the network characteristics that apply to that area. For describing an area, we build upon the existing standard, the Geography Markup Language (GML), developed by the Open Geospatial Consortium (OGC). GML version 3.2.1 is available at the OGC website: http://www.opengeospatial.org/standards/gml.

GML is also an ISO standard with the reference ISO 19136:2007.

Basic to the invention is the creation of areas that share most of their characteristics, to a certain degree. It is therefore a goal of the present invention to define a protocol for encoding a geographical area as well as its corresponding observed characteristics.

Let a polygon be defined as a planar surface defined by one exterior boundary and zero or more interior boundaries. The example in Table I describes a squared area determined by four different points whose relative coordinates are (0, 0), (100, 0), (100, 100), and (0, 100), wherein a fifth point (0, 0) equals the first one.

TABLE 1

Example of a polygon definition in GML

```
<gml:Polygon>
    <gml:outerBoundaryIs>
        <gml:LinearRing>
            <gml:posList>0,0 100,0 100,100 0,100 0,0</gml:posList>
        </gml:LinearRing>
    </gml:outerBoundaryIs>
</gml:Polygon>
```

It is possible to represent other areas in GML different than polygons, for example, line strings, curves, grids, etc.

The following Table 2 is a more detailed example comprising the definition of an area with an aggregated observation that describes the network characteristics as well as the degree of uncertainty and confidence in the observation.

TABLE 2

Example of an area and its observed characteristics

```
<Feature fid="142" featureType="access-network" >
    <Description>Cell ID 049230</Description>
    <Property Name="Confidence" type="Float" value="0.95"/>
    <Property Name="Uncertainty" type="Float" value="0.1"/>
    <Property Name="Technology" type="String" value="WLAN"/>
    <Property Name="SSID" type="String" value="Operator-A"/>
    <Property Name="Band" type="String" value="2.4GHz"/>
    <Property Name="Channel" type="Integer" value="5"/>
    <Property Name="Modulation" type="String" value="OFDM"/>
    <Property Name="Bandwidth" type="String" value="22MHz"/>
        <Polygon name="extent" srsName="epsg:27354">
            <LineString name="extent" srsName="epsg:27354">
                <CData>
                    491888.999999459,5458045.99963358
                    491904.999999458,5458044.99963358
                    491908.999999462,5458064.99963358
                    491924.999999461,5458064.99963358
                    491925.999999462,5458079.99963359
                    491977.999999466,5458120.99963360
                    491953.999999466,5458017.99963357
                </CData>
            </LineString>
        </Polygon>
</Feature>
```

Table 2 contains a number of new properties (highlighted in bold font) that describe the observed characteristics in the described area. In the example, there are new properties describing the confidence, uncertainty, technology, SSID, band, channel, modulation, and bandwidth of the observation of the geographical area described in the same example.

The invention provides a mechanism for a provisioning UE 12 describing the observed network characteristics in a given geographical point or geographical area. In particular, the observation in a geographical area offers much less bandwidth consumption for transmitting the observations from the provisioning UE 12 to the ANDSF server 14, if we compare with transmitting a number of observations taken at individual geographical points inside the geographical area.

Means are provided for not requiring infinite storage or computing power in provisioning UEs 12.

The invention uses the Geography Markup Language (GML) and extends it with a number of properties that describe the characteristics of an observed telecommunication network, together with values for the uncertainty and confidence.

Abbreviations

ANDSF: Access Network Discovery and Selection Function

GML: Geography Markup Language

ISO: International Organization for Standardization

OGC: Open Geospatial Consortium

OMA: Open Mobile Alliance.

PUE: Provisioning User Equipment

UE: User Equipment

Although the invention has been described in detail in the foregoing embodiments for the purpose of illustration, it is to be understood that such detail is solely for that purpose and that variations can be made therein by those skilled in the art without departing from the scope of the invention except as it may be described by the following claims.

The invention claimed is:

1. A Provisioning User Equipment (PUE) in communication with an Access Network Discovery and Selection Function (ANDSF) server through an access network, the PUE comprising:

a network interface unit configured to send a registration request to the ANDSF server through the access network and to receive a successful authentication result and a set of configuration instructions from the ANDSF server;

a processing unit, in communication with the network interface, the processing unit configured to:

determine at least one observation trigger from the set of configuration instructions, upon fulfillment of the observation trigger;

activate at least one interface supported by the PUE, which the set of configuration instructions requires to be monitored; and for each activated interface in communication with the processing unit, observe accessible networks and corresponding network characteristics; and a memory, in communication with the processing unit, configured to store observation data and geographical points where an observation takes place;

the processing unit configured to determine data identifying consolidated areas, each consolidated area including those geographical points with given network characteristics for at least one accessible network, the data identifying consolidated areas being stored in the memory and submitted by the network interface unit to the ANDSF server through the access network.

2. The PUE of claim 1 wherein the processing unit is further configured to determine at least one process trigger and at least one transmission trigger from the set of configuration instructions.

3. The PUE of claim 2 wherein upon fulfillment of the process trigger, the processing unit is further configured to process the stored observations, identifying geographical points where the accessible network shares at least one network characteristic.

4. The PUE of claim 2 wherein upon fulfillment of the transmission trigger, the processing unit is further configured to transmit, from the network interface unit, the data identifying consolidated areas through the access network to the ANDSF server.

5. An Access Network Discovery and Selection Function (ANDSF) server in communication with a Provisioning User Equipment (PUE) through an access network, the ANDSF server comprising:
a network interface unit configured to receive a registration message from the PUE through the access network;
a processing unit configured to authenticate the PUE, and generate a set of configuration instructions for the PUE by taking into account subscription data and PUE characteristics, the set of configuration instructions including at least one observation trigger for the PUE, the processing unit configured to send, from the network interface unit and through the access network to the PUE, a successful authentication result and the set of configuration instructions; and
a memory configured to store data identifying consolidated areas received by the network interface unit from the PUE through the access network.

6. The ANDSF server of claim 5 wherein the network interface unit is further configured to send a challenge to the PUE through the access network for the PUE to be authenticated.

7. The ANDSF server of claim 6 wherein the network interface unit is further configured to receive a challenge response in a second registration message.

8. The ANDSF server of claim 7 wherein the processing unit is configured to compare the challenge response received from the PUE with a local result determined by the processing unit for a match, and to authenticate the PUE if there is a match.

9. A method of provisioning an Access Network Discovery and Selection Function (ANDSF) server by a Provisioning User Equipment (PUE) through an access network, the method comprising:
receiving a registration message by a network interface unit of the ANDSF server from the PUE through the access network;
authenticating the PUE by a processing unit of the ANDSF server;
generating, by the processing unit of the ANDSF server, a set of configuration instructions for the PUE by taking into account subscription data and PUE characteristics, the set of configuration instructions including at least one observation trigger for the PUE;
sending, to the PUE by the processing unit and from the network interface unit of the ANDSF server through the access network, a successful authentication result and the set of configuration instructions; and
storing, in a memory of the ANDSF server, data identifying consolidated areas received by the network interface unit from the PUE through the access network.

10. The method of claim 9 further comprising:
sending, at the network interface unit of the ANDSF server, a challenge to the PUE through the access network for the PUE to be authenticated.

11. The method of claim 10 further comprising:
receiving, at the network interface unit of the ANDSF server, a challenge response in a second registration message.

12. The method of claim 11 further comprising:
comparing, at the processing unit, the challenge response received from the PUE with a local result determined by the processing unit for a match; and
authenticating the PUE at the processing unit if there is a match.

13. A method for a Provisioning User Equipment (PUE) provisioning an Access Network Discovery and Selection Function (ANDSF) server through an access network, the method comprising:
sending a registration request from a network interface unit of the PUE to the ANDSF server through the access network;
receiving, by the network interface unit of the PUE, a successful authentication result and a set of configuration instructions from the ANDSF server through the access network;
determining, using a processing unit of the PUE, at least one observation trigger from the set of configuration instructions upon fulfillment of the observation trigger, the processing unit activating at least one interface supported by the PUE, which the set of configuration instructions requires to be monitored;
for each activated interface, the processing unit causing accessible networks and corresponding network characteristics to be observed;
storing, in a memory of the PUE, observation data and geographical points where an observation takes place;
determining, with the processing unit of the PUE, data identifying consolidated areas, each consolidated area including geographical points with given network characteristics for at least one accessible network;
storing, in the memory of the PUE, the data identifying consolidated areas; and
submitting the data identifying consolidated areas by the network interface unit of the PUE to the ANDSF server through the access network.

14. The method of claim 13 further comprising:
determining, at the processing unit, at least one process trigger and at least one transmission trigger from the set of configuration instructions.

15. The method of claim 14, upon fulfillment of the process trigger, further comprising:
processing, at the processing unit, the stored observations; and
identifying, at the processing unit, geographical points where the accessible network share at least one network characteristic.

16. The method of claim 14, upon fulfillment of the transmission trigger, further comprising:
transmitting the consolidated areas at the network interface unit of the processing unit and through the access network to the ANDSF server.

* * * * *

UNITED STATES PATENT AND TRADEMARK OFFICE
CERTIFICATE OF CORRECTION

| | | |
|---|---|---|
| PATENT NO. | : 8,768,355 B2 | |
| APPLICATION NO. | : 13/337791 | |
| DATED | : July 1, 2014 | |
| INVENTOR(S) | : Garcia Martin et al. | |

It is certified that error appears in the above-identified patent and that said Letters Patent is hereby corrected as shown below:

In the Specification

In Column 7, Line 31, delete "TD," and insert -- ID, --, therefor.

Signed and Sealed this
Fourteenth Day of October, 2014

Michelle K. Lee
*Deputy Director of the United States Patent and Trademark Office*